United States Patent
Kajiki

(10) Patent No.: US 12,489,634 B2
(45) Date of Patent: Dec. 2, 2025

(54) AUTHENTICATION DEVICE, AUTHENTICATION SYSTEM, AUTHENTICATION METHOD, AND AUTHENTICATION PROGRAM

(71) Applicant: NEC Corporation, Tokyo (JP)

(72) Inventor: Yoshihiro Kajiki, Tokyo (JP)

(73) Assignee: NEC CORPORATION, Tokyo (JP)

(*) Notice: Subject to any disclaimer, the term of this patent is extended or adjusted under 35 U.S.C. 154(b) by 491 days.

(21) Appl. No.: 17/918,608

(22) PCT Filed: Apr. 28, 2020

(86) PCT No.: PCT/JP2020/018169
§ 371 (c)(1),
(2) Date: Oct. 13, 2022

(87) PCT Pub. No.: WO2021/220423
PCT Pub. Date: Nov. 4, 2021

(65) Prior Publication Data
US 2023/0142255 A1   May 11, 2023

(51) Int. Cl.
*G06V 40/18* (2022.01)
*G06F 3/01* (2006.01)
(Continued)

(52) U.S. Cl.
CPC ............ *H04L 9/3231* (2013.01); *G06F 3/013* (2013.01); *G06T 7/70* (2017.01); *G06V 40/172* (2022.01);
(Continued)

(58) Field of Classification Search
CPC ..... H04L 9/3231; H04L 9/3271; G06F 3/013; G06F 21/32; G06T 7/70;
(Continued)

(56) References Cited

U.S. PATENT DOCUMENTS 6,785,406 B1   8/2004 Kamada
8,646,060 B1 * 2/2014 Ben Ayed ............... H04W 4/20
726/9
(Continued)

FOREIGN PATENT DOCUMENTS

JP   S58-176781 A   10/1983
JP   S59-194274 A   11/1984
(Continued)

OTHER PUBLICATIONS

International Search Report for PCT Application No. PCT/JP2020/018169, mailed on Sep. 8, 2020.
(Continued)

*Primary Examiner* — Aaron W Carter
(74) *Attorney, Agent, or Firm* — Sughrue Mion, PLLC

(57) ABSTRACT

The output means 81 outputs a plurality of candidate responses to questions to the target on a display device. The response specification means 82 specifies a response to the question from among the candidate responses based on a target's gaze in a face image captured by an imaging device that captures a face image of the target. The response judgment means 83 makes a correctness or incorrectness judgment of the specified response. The face authentication means 84 performs target's face authentication from the face image captured by the imaging device. The biometric determination means 85 performs target's biometrics determination based on changes in the target's gaze detected from a plurality of the face image. The target authentication means 86 authenticates the target based on results of the correctness or incorrectness judgment, the biometrics determination, and the face authentication.

9 Claims, 10 Drawing Sheets

(51) Int. Cl.
*G06T 7/70* (2017.01)
*G06V 40/16* (2022.01)
*G06V 40/40* (2022.01)
*H04L 9/32* (2006.01)

(52) U.S. Cl.
CPC ............ *G06V 40/40* (2022.01); *H04L 9/3271* (2013.01); *G06T 2207/30201* (2013.01)

(58) Field of Classification Search
CPC ........ G06T 2207/30201; G06V 40/172; G06V 40/40; G06V 40/67; G06V 40/18
See application file for complete search history.

(56) References Cited

U.S. PATENT DOCUMENTS

| | | | |
|---|---|---|---|
| 9,032,498 B1* | 5/2015 | Ben Ayed | G06F 21/35 726/9 |
| 2009/0022368 A1* | 1/2009 | Matsuoka | G06V 20/58 382/103 |
| 2009/0109400 A1* | 4/2009 | Yoshinaga | G06F 3/013 351/210 |
| 2009/0222421 A1 | 9/2009 | Aoki et al. | |
| 2014/0130148 A1 | 5/2014 | Sako et al. | |
| 2015/0213634 A1* | 7/2015 | Karmarkar | G06T 11/001 345/589 |
| 2017/0048230 A1* | 2/2017 | Johansson | H04L 9/3271 |
| 2017/0228586 A1 | 8/2017 | Morishita | |
| 2017/0255817 A1* | 9/2017 | Tomimori | G06Q 30/0201 |
| 2018/0239955 A1 | 8/2018 | Rodriguez et al. | |
| 2018/0348751 A1* | 12/2018 | Newman | G05D 1/0246 |
| 2018/0350257 A1* | 12/2018 | Picard | G06F 3/013 |
| 2019/0034606 A1* | 1/2019 | Mapen | G06F 21/36 |
| 2020/0065394 A1* | 2/2020 | Calderon | G10L 15/26 |
| 2021/0034893 A1* | 2/2021 | Ebihara | G06V 40/168 |
| 2021/0089640 A1* | 3/2021 | DeRosa-Grund | G06F 18/25 |
| 2021/0342433 A1* | 11/2021 | Fujita | G06Q 20/3224 |
| 2022/0188389 A1* | 6/2022 | Benkreira | G06F 21/40 |
| 2023/0033687 A1* | 2/2023 | Chandrasekaran | G06V 40/45 |
| 2023/0099736 A1* | 3/2023 | Taketa | G06F 3/013 434/362 |
| 2023/0142255 A1* | 5/2023 | Kajiki | H04L 9/3231 382/118 |

FOREIGN PATENT DOCUMENTS

| | | |
|---|---|---|
| JP | S63-313288 A | 12/1988 |
| JP | H11-339048 A | 12/1999 |
| JP | 2001-034754 A | 2/2001 |
| JP | 2005-100366 A | 4/2005 |
| JP | 2005-149326 A | 6/2005 |
| JP | 2006-277396 A | 10/2006 |
| JP | 2009-071430 A | 4/2009 |
| JP | 2009-205542 A | 9/2009 |
| JP | 2014-092941 A | 5/2014 |
| JP | 2017-142859 A | 8/2017 |
| JP | 2017-162420 A | 9/2017 |
| WO | 2012/086657 A1 | 6/2012 |
| WO | 2016/059786 A1 | 4/2016 |
| WO | 2019/023032 A1 | 1/2019 |

OTHER PUBLICATIONS

SG Office Action for SG Application No. 11202254249H, mailed on Nov. 28, 2024 with English Translation.
JP Office Action for JP Application No. 2022-518509, mailed on Nov. 14, 2023 with English Translation.
JP Office Communication for JP Application No. 2022-518509, mailed on Dec. 26, 2023 with English Translation.

* cited by examiner

AUTHENTICATION DEVICE, AUTHENTICATION SYSTEM, AUTHENTICATION METHOD, AND AUTHENTICATION PROGRAM

This application is a National Stage Entry of PCT/JP2020/018169 filed on Apr. 28, 2020, the contents of all of which are incorporated herein by reference, in their entirety.

TECHNICAL FIELD

The present invention relates to an authentication device, an authentication system, an authentication method, and an authentication program that authenticates a target.

BACKGROUND ART

Various methods of authenticating a target are known. A physical key, such as classic waybill or a ticket, is one of the authentication methods. Patent literature 1 also describes key authentication, which authenticates an electronic key stored in a device such as an ID card.

However, key authentication is inconvenient because the target must carry a key in some way, and there is a high risk of unauthorized access due to theft or loss. In contrast, there is a method of authentication similar to the classic password, in which the target and the authenticator agree on keywords such as PIN, password, and responds to secret questions in advance, and the target is asked to enter the keywords from a keyboard or touch panel. This type of authentication method is hereinafter referred to as keyword authentication.

The keyword authentication is becoming popular because the authentication key is stored in the target's memory, thus eliminating the need for personal belongings. However, when keywords are input from a keyboard or touch panel, it is difficult for the target to input the keywords when the target is carrying luggage in both hands. The keyword authentication is also problematic because there is a high risk that a third party will intercept input from a keyboard or touch panel, leak keywords, and gain unauthorized access.

One possible solution to this problem is to have the target orally utter the keywords and obtain the input of the keywords via voice authentication. However, this method increases the risk of unauthorized access because keywords can be easily heard by a third party in the vicinity.

Also known is a method that uses eye movements as an alternative technique to keyword input from a keyboard or touch panel in situations where both hands are not available. Patent literature 2 describes a method of eye input communication using eye movements. Specifically, Patent literature 2 describes an authentication method that uses a camera to observe eye opening and closing, and authenticates the order of opening and closing of one eye, for example, "right, left, left, right," as a substitute for a PIN, and a method that substitutes input from a keyboard or touch panel by using eye direction and blinking.

In addition, Patent literature 3 describes a method of performing user authentication processing using gaze input. In the case of gaze input, the gaze itself may be inferred by surrounding third parties from eye movements, but the exact direction of gaze cannot be determined without looking at the eyeballs from an angle close to the front of the face. Therefore, since it is difficult to simultaneously steal both the movement of the eyeballs and the image to which the gaze is directed, this method is an effective method to solve the issue of the risk of unauthorized access.

In addition, various other biometric authentication methods are also known, in which biometric information such as fingerprints, face, and iris of the target is recorded in advance and used as a key for authentication (see, for example, Patent literatures 4 to 6).

Furthermore, in order to improve the security strength of authentication, a method of authentication using multiple factors has also been proposed. Patent literature 7 describes a multi-factor authentication method that uses multiple factors for authentication. In addition, Patent literature 8 describes a method that combines password authentication using eye gaze input and biometric authentication.

Even in face authentication, where it is difficult for a third party to spoof a person, there is a risk of spoofing using a photograph of the person's face or a three-dimensional doll that replicates the person's face to obtain authentication. A method for preventing such spoofing is described in Patent literature 9. In the method described in Patent literature 9, the target's face image is acquired multiple times to check for facial changes, and in the process, movements such as blinking or opening the mouth are required to confirm that the person is not a doll.

CITATION LIST

Patent Literature

PTL 1: Japanese Patent Laid-Open No. Sho 63-313288
PTL 2: Japanese Patent Laid-Open No. 2005-100366
PTL 3: Japanese Patent Laid-Open No. 2014-92941
PTL 4: Japanese Patent Laid-Open No. Sho 58-176781
PTL 5: Japanese Patent Laid-Open No. Sho 59-194274
PTL 6: Japanese Patent Laid-Open No. 2001-34754
PTL 7: Japanese Patent Laid-Open No. 2009-71430
PTL 8: Japanese Patent Laid-Open No. 2006-277396
PTL 9: Japanese Patent Laid-Open No. Hei 11-339048

SUMMARY OF INVENTION

Technical Problem

On the other hand, when the order in which eyes are opened and closed is used as a substitute for the PIN as described in Patent literature 2, there is a high risk of unauthorized access because, as with voice, it is easy for a surrounding third party to steal the PIN.

In response to this problem, the method described in Patent literature 3 reduces the risk of unauthorized access because the user authentication process is performed using eye gaze input. However, with the method described in Patent literature 3, there is still a possibility of unauthorized access if the user authentication image is known to others.

On the one hand, the biometric authentication methods described above all have the advantage that they do not require ID cards or other personal belongings to be carried, and it is extremely difficult for a third party to steal the key and spoof the user. On the other hand, some biometric authentication methods require special input devices. For example, in the case of fingerprint or iris authentication, a special input device is required, and the target is required to place target's finger or eye on a certain position. Therefore, there is a problem of convenience during authentication for both the authenticator and the target.

On the other hand, among biometric authentication, face authentication does not require a special input device, and can authenticate images taken from a slightly distant position with a normal camera. It can be said that this is an extremely convenient authentication method that has the advantages of biometric authentication and does not pose the same problems as fingerprint or iris authentication. However, even this type of face authentication may reach its accuracy limit when the number of targets to be matched increases, and the problem of spoofing remains.

In the method described in Patent literature 8, authentication is performed using voiceprint information, face images, and palm prints, as well as password authentication using gaze input. However, the authentication method using voiceprint information and palm prints compromises convenience, and the problem of spoofing, as described above, still remains with authentication using face images.

In addition, Patent literature 9 also describes that the target is required to wait in front of the authentication device until the authentication device obtains a facial image multiple times to confirm that it is not a spoofing, or the target is required to blink or open his/her mouth as instructed. However, such responses are inconvenient for the target and impair comfort, resulting in reduced convenience.

Therefore, it is an exemplary object of the present invention is to provide an authentication device, an authentication system, an authentication method, and an authentication program that can detect spoofing of the target and authenticate the target with high accuracy, while improving the convenience of the authenticator and the target during authentication.

Solution to Problem

The authentication device according to the present invention is an authentication device that includes an output means which outputs a plurality of candidate responses to questions to the target on a display device, a response specification means which specifies a response to the question from among the candidate responses based on a target's gaze in a face image captured by an imaging device that captures a face image of the target, a response judgment means which makes a correctness or incorrectness judgment of the specified response, a face authentication means which performs target's face authentication from the face image captured by the imaging device, a biometric determination means which performs target's biometrics determination based on changes in the target's gaze detected from a plurality of the face image, and a target authentication means which authenticates the target based on results of the correctness or incorrectness judgment, the biometrics determination, and the face authentication.

The authentication system according to the present invention is an authentication system that includes an imaging device which captures a face image of the target, an output means which outputs a plurality of candidate responses to questions to the target on a display device, a response specification means which specifies a response to the question from among the candidate responses based on a target's gaze in the captured face image, a response judgment means which makes a correctness or incorrectness judgment of the specified response, a face authentication means which performs target's face authentication from the captured face image, a biometric determination means which performs target's biometrics determination based on changes in the target's gaze detected from a plurality of the face image, and a target authentication means which authenticates the target based on results of the correctness or incorrectness judgment, the biometrics determination, and the face authentication.

The authentication method according to the present invention is an authentication method that includes outputting a plurality of candidate responses to questions to the target on a display device, specifying a response to the question from among the candidate responses based on a target's gaze in a face image captured by an imaging device that captures a face image of the target, making a correctness or incorrectness judgment of the specified response, performing target's face authentication from the face image captured by the imaging device, performing target's biometrics determination based on changes in the target's gaze detected from a plurality of the face image, and authenticating the target based on results of the correctness or incorrectness judgment, the biometrics determination, and the face authentication.

The authentication program according to the present invention is a program that is applied to a computer that authenticates a target, and causes a computer to execute an output process of outputting a plurality of candidate responses to questions to the target on a display device, a response specification process of specifying a response to the question from among the candidate responses based on a target's gaze in a face image captured by an imaging device that captures a face image of the target, a response judgment process of making a correctness or incorrectness judgment of the specified response, a face authentication process of performing target's face authentication from the face image captured by the imaging device, a biometric determination process of performing target's biometrics determination based on changes in the target's gaze detected from a plurality of the face image, and a target authentication process of authenticating the target based on results of the correctness or incorrectness judgment, the biometrics determination, and the face authentication.

Advantageous Effects of Invention

According to the exemplary aspect of the present invention, it is possible to detect spoofing of the target and authenticate the target with high accuracy, while improving the convenience of the authenticator and the target during authentication.

DESCRIPTION OF EMBODIMENTS

Figure 1:
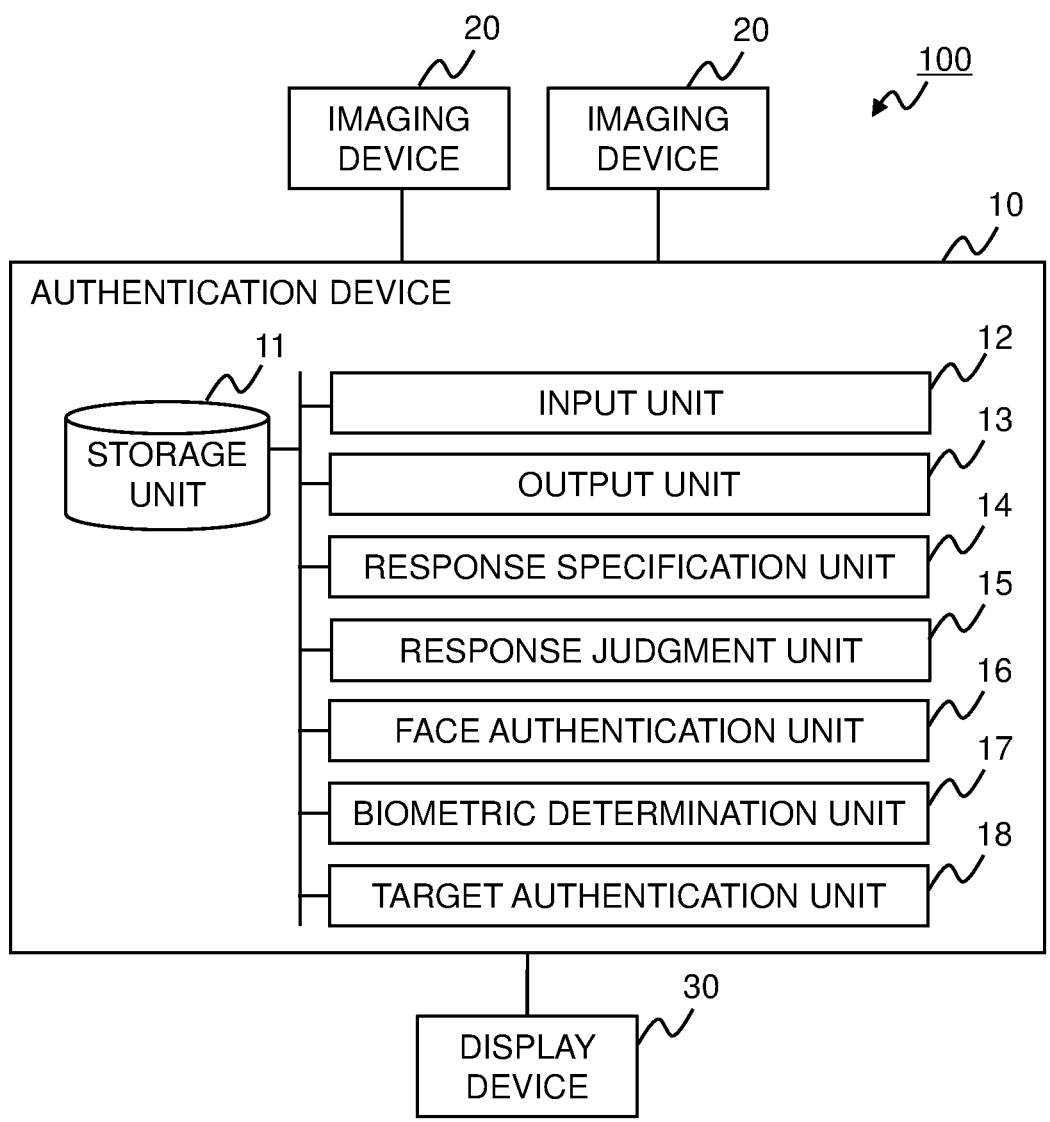
FIG. 1 It depicts a block diagram showing a configuration example of a first exemplary embodiment of an authentication system according to the present invention.

In this exemplary embodiment, multiple authentication methods are used together to authenticate the target with high accuracy and to reduce the risk of spoofing. The combined use of authentication methods not only increases the accuracy of authentication, but also reduces the risk of spoofing. For example, it is assumed a method in which a PIN is used in addition to face authentication. In this case of this method, although it is possible to obtain the target's face photo and spoof the target against facial authentication, the PIN must also be obtained to be authenticated, which has the effect of greatly reducing the risk of spoofing.

However, simply using a combination of authentication methods may compromise advantages and convenience. For example, if face authentication is determined to be insufficiently accurate, key authentication, as described above, could be used as a second authentication factor. However, the addition of key authentication would compromise the major advantage of face authentication, which is the elimination of the need for personal belongings to be carried.

Another possible method is to use keyword authentication as a second authentication factor, as described above. However, since keyword authentication requires manual input, the advantage of face authentication, for example, that authentication can be performed even when the user is holding luggage in both hands, is lost.

Furthermore, fingerprint and iris authentication could be used as a second authentication factor. However, as mentioned above, fingerprint and iris authentication require a special input device, and thus, convenience for the authenticator is compromised.

Therefore, in this exemplary embodiment, the target of the user to be authenticated (hereinafter referred to as the "target") is authenticated based on the results of the correctness or incorrectness judgment of the responses given by the target and the target's biometrics determination. The authentication in this exemplary embodiment includes the broad concept of authenticating the suitability of an individual, such as identifying the target and determining whether or not the target has authority.

First, a brief description of the features of this invention will be given. The first feature of this invention is that some question is asked to the target and multiple candidate responses to the question are presented at random locations on the display device. The target is then asked to gaze at the responses, and by authenticating the selected response from the direction of the target's gaze, the system authenticates whether the selected response is the correct response. In the following description, this method is referred to as gaze input keyword authentication.

The gaze input keyword authentication can be said to replace the manual input using a keyboard or touch panel with the gaze input with respect to the input of a keyword in the keyword authentication. This allows for highly accurate authentication of individuals and has the effect of allowing information to be input even when the target's hands are occupied, while maintaining the characteristics of keyword authentication, which is that the target does not need to carry an ID card or other personal belongings as is the case with key authentication.

Furthermore, it is compared the method in which keyword input in keyword authentication is performed by voice authentication with the method in which the gaze input keyword authentication is performed. In the gaze input keyword authentication, a third party in front of the target can identify the direction of the target's gaze, but cannot see the candidate responses on the display device. A third party behind the target can see the candidate responses on the display device, but not the direction of the target's gaze. Thus, the gaze input keyword authentication has the effect that there is very little risk of a third party in the vicinity being able to spy on the responses selected by the gaze.

This feature not only provides high security to the target of personal authentication. Specifically, the authenticator that performs personal authentication does not need to install walls or shields to block a furtive glance or eavesdropping by third parties, and can be used in open spaces with many third parties around, a convenience that is not available with general keyword authentication or keyword authentication using voice authentication.

Furthermore, the components necessary to implement this authentication method may include a display device that mainly presents candidate responses, a camera that takes pictures of the target, and a CPU (Central Processing Unit) that analyzes the direction of gaze. Therefore, the system can be implemented simply by installing an authentication program on a commercially available tablet or laptop PC. In this respect, the system provides a high level of convenience to the authenticator.

Furthermore, a second feature of the invention is the combination of the gaze input keyword authentication described above and face authentication of the target. The gaze input keyword authentication also does not require any personal belongings to be carried, is hands-free, and does not present the same convenience issues as fingerprint or iris authentication. Therefore, when the gaze input keyword authentication is used in combination with face authentication, it can be said that the advantages of face authentication are rarely compromised. Therefore, the gaze input keyword authentication has an effect that cannot be obtained by combining it with other authentication methods as a multi-factor authentication that augments face authentication.

In addition, both the gaze input keyword authentication and face authentication can share a single camera that captures images of the face. Therefore, the cost and construction for augmenting face authentication with multi-factor authentication are low, and face authentication and eye direction measurement can be performed at the same time. Thus, the burden on both the target and the authenticator can be reduced, a practical effect that is not a mere combination.

Furthermore, a third feature of the invention, in addition to the features described above, is to verify that the gaze of the person whose face is authenticated is moving by performing face authentication and measurement of the gaze of the target selecting a response multiple times in parallel. This allows verification that the target is a living body of a person.

Both face authentication and the gaze key word authentication are authentication methods that make it difficult for a third party to spoof the user. However, there is still a risk that a third party could spoof a person with a time lag, for example, by performing face recognition using a photograph of the person's face or a three-dimensional doll that replicates the face, and then a third party taking over and performing the gaze input keyword recognition.

In contrast, in this exemplary embodiment, the face authentication and the measurement of the target's gaze to select a response are performed multiple times in parallel to verify that the gaze of the person whose face is authenticated is moving. This has the effect of eliminating spoofing by a mug shot of the person's face or a three-dimensional doll with a duplicated face.

To add, it is not possible to verify that the person whose face is authenticated is a living body simply by performing multiple authentications in face authentication as mentioned in the first feature. In addition, if the second feature, the gaze input keyword authentication, only verifies that the person is a living body based on gaze movement, there is still a risk of unauthorized access due to leakage of keywords. On the other hand, the combination of the three features described above can cover all of these issues, and thus has a special effect that cannot be obtained by simply combining them.

Other features of the invention include: presenting candidate responses on the display device, obtaining the time when the target selects the response by moving target's gaze and the result of face authentication using a face image obtained at the same time, and thereby verifying that the person is the living body matched by face authentication.

By obtaining the results of face authentication at the same time as the time when the target selects a response by moving the target's gaze and verifying that the target is the living body matched by face authentication, this has the effect of preventing spoofing due to the time difference as described above.

A further feature of the invention is to check a relative angle change of the gaze with respect to the direction of a face while the target moves the gaze and selects a response. This makes it possible to verify that the target is the living body matched by face authentication.

For example, a third party may control the direction of the 3D doll's gaze by changing the angle of the doll's entire face and spoof the gaze input keyword authentication while using a 3D doll that replicates the person's face to spoof face authentication.

However, in this exemplary embodiment, even for such a high degree of spoofing, the relative angle change of the gaze with respect to the direction of the face is confirmed while the target moves the gaze to select a response. Such a configuration enables verification that the living body is moving his/her gaze, rather than the entire face of the photograph or three-dimensional doll, and thus has the effect of suppressing such a high degree of spoofing as described above.

Furthermore, even when the additional features described above are realized, the required components remain the same. In other words, it is possible to realize the features described above simply by installing an authentication program on a commercially available tablet or laptop PC. These features may be realized using multiple devices, circuits, and programs. If the service as a whole satisfies the components to realize the features described above, it can provide high reliability and convenience to the authenticator and the target while maintaining the same effects as described above.

The following is a description of the exemplary embodiment of the invention with reference to the drawings.

Exemplary Embodiment 1

FIG. 1 is a block diagram showing a configuration example of a first exemplary embodiment of an authentication system according to the present invention. The authentication system 100 in this exemplary embodiment includes an authentication device 10, an imaging device 20, and a display device 30. The imaging device 20 is installed in the vicinity of the display device 30 and at a position that enables imaging of the target's viewing movement toward the display device 30.

The imaging device 20 is a device that captures a target's face image. The imaging device 20 may, for example, obtain an image of each frame captured in chronological order as a video image as the target's face image. The imaging device 20 may capture the target's face image at the timing when it detects a person within the imaging range, or may capture the target's face image at the timing when the target performs some action to the authentication device 10. In the example shown in FIG. 1, the authentication system 100 is shown with two imaging devices 20. However, the system may include only one imaging device 20.

The display device 30 outputs various information according to the instructions of the output unit 13 described below. The display device 30 is realized, for example, by a display device or a tablet.

The authentication device 10 includes a storage unit 11, an input unit 12, an output unit 13, a response specification unit 14, a response judgment unit 15, a face authentication unit 16, a biometric determination unit 17, and a target authentication unit 18.

The storage unit 11 stores various information used by the authentication device 10 for processing. For example, the storage unit 11 may store face images and features used for authentication by the face authentication unit 16 described below. The storage unit 11 may also store questions to be asked to the target and candidate responses to those questions. Here, the candidate response is information that includes a correct response to the question and an incorrect response to the question. The questions may be prepared for each identified target. The storage unit 11 is realized by, for example, a magnetic disk.

The input unit 12 accepts input of a face image of a target captured by the imaging device 20. For example, if there are multiple imaging devices 20, the input unit 12 may accept input of the face image along with information identifying the imaging device 20 that captured the face image.

The output unit 13 outputs multiple candidate responses to questions to be asked to the target on the display device 30. Specifically, when the target appears, the output unit 13 outputs a question to the target and multiple candidate responses to the question at a random position on the display device 30, and requests the target to view the responses. By outputting multiple candidate responses at random locations, it is possible to move the gaze of the target checking the response in various directions, making it easier for the biometric determination unit 17, described below, to make a judgment.

The content of the questions and candidate responses are arbitrary and may be predetermined. The output unit 13 may, for example, ask questions such as "What is your ID number?" and "What is your PIN?" etc. on the screen, and an icon with numbers from 0 to 9 may be output at a random position on the display device as multiple candidate responses to the question. However, the questions and the candidate responses are not limited to this example.

The questions do not have to be output to the display device 30, but may be output from a speaker (not shown), for example, by voice.

If the target is authenticated by the face authentication unit 16 (described below), the output unit 13 may output a target-specific question and a plurality of candidate responses corresponding to the question on the display device 30. Specifically, the output unit 13 may output a secret question created by the target and candidate responses to that question. For example, the output unit 13 may output a secret question, such as "What is the name of the elementary school you graduated from?" or "What is your mother's maiden name?", prepared in advance by the person whose features match the face image, and the candidate response that is a response (and an incorrect response) to the question. By using such questions and candidate responses, it is possible to increase the security of authentication.

The response specification unit 14 specifies the response to the question from among multiple candidate responses based on the target's gaze in the captured face image. In other words, the response specification unit 14 measures the direction of gaze from the face image and specifies the selected response based on the direction of the target's gaze.

The method of specifying the position to which the target gazes based on the target's gaze is arbitrary. For example, the response specification unit 14 may specify the position at which the target gazes at the display device 30 using the method described in Patent literature 2. Specifically, the response specification unit 14 may measure the direction of the target's gaze from the position of the target's eyes, and may specify the candidate response output at the position where a direction vector of the gaze starting from the target's eye position intersects with the display unit 30 as the response selected by the target.

Since a person's gaze actually fluctuates, the response specification unit 14 may consider the candidate response at the position where the target's gaze remains for a certain time as the response selected by the target. The response specification unit 14 may also consider the candidate response at the position indicated by the target's gaze just before the target blinked as the response selected by the target. By allowing such fluctuation, the accuracy of specifying the response selected by the target can be improved.

The response judgment unit 15 makes a correctness or incorrectness judgment of the specified response. Specifically, the response judgment unit 15 compares the response selected by the target with the correct response registered in advance, and judges whether the response is correct or incorrect. Based on the judgment result, the response judgment unit 15 judges that the response is authenticated if it is correct, and judges that the response is not authenticated if it is incorrect.

The face authentication unit 16 performs target's face authentication from the captured face image. The method by which the face authentication unit 16 authenticates the target's face is arbitrary. For example, the face authentication unit 16 may perform face authentication by extracting facial features from the face image and determining whether or not the features match the facial features of a person stored in the storage unit 11 in advance.

The biometric determination unit 17 performs target's biometrics determination based on changes in the target's gaze detected from a plurality of face images captured. More precisely, the biometric determination unit 17 determines the target's biometrics based on changes in the direction of the target's gaze detected in the plurality of face images captured in chronological order.

Specifically, the biometric determination unit 17, for example, receives the face images captured by the imaging device 20 in chronological order, and when the direction of the target's gaze in the received face images is changing, the biometric determination unit 17 may determine that the target is a living body. The biometric determination unit 17 may, for example, continue the authentication process by the face authentication unit 16 during the gaze input keyword authentication (i.e., during the processing of the response specification unit 14 and response judgment unit 15) and accept the results of that process to perform biometric determination. In other words, by repeating face recognition while the target is moving his/her gaze to the output candidate responses in the gaze input keyword authentication, the biometric determination unit 17, as a result, can automatically verify that the face image authenticated by the facial recognition is the living body whose gaze is moved.

In other words, by performing the gaze input keyword authentication and face authentication in parallel, the target's gaze inevitably moves, then the biometric determination unit 17 can use this movement in gaze as a factor in biometric determination.

The target authentication unit 18 authenticates the target based on the results of the correctness or incorrectness judgment by the response judgment unit 15, the biometric determination by the biometric determination unit 17, and the face authentication by the face authentication unit 16. Specifically, when the response is determined to be correct by the response judgment unit 15, the target is determined to be a living body by the biometric determination unit 17, and the target is authenticated by the face authentication unit 16, then the target authentication unit 18 authenticates the target authenticated by the face authentication unit 16 as the appropriate target, and denies the target when even one of the above judgments or authentications has not been made.

In this exemplary embodiment, the case in which the authentication system 100 includes two imaging devices 20 is shown. Therefore, the response specification unit 14 specifies the response using the image (first face image) captured by a first imaging device, and the face authentication unit 16 may perform target's face authentication using the image (second face image) captured by a second imaging device. In this way, by providing imaging devices 20 that capture a face image for each process, it is possible to use the appropriate image for each process.

The input unit 12, the output unit 13, the response specification unit 14, the response judgment unit 15, the face authentication unit 16, the biometric determination unit 17, and the target authentication unit 18 are provided by a computer processor (for example, CPU (Central Processing Unit), GPU (Graphics Processing Unit) operating according to the program (authentication program).

For example, a program may be stored in the storage unit 11, and the processor may read the program and, according to the program, the input unit 12, the output unit 13, the response specification unit 14, the response judgment unit 15, the face authentication unit 16, the biometric determination unit 17, and the target authentication unit 18. In addition, the functions of the input unit 12, the output unit 13, the response specification unit 14, the response judgment unit 15, the face authentication unit 16, the biometric determination unit 17, and the target authentication unit 18 may be provided in SaaS (Software as a Service) format.

The input unit 12, the output unit 13, the response specification unit 14, the response judgment unit 15, the face authentication unit 16, the biometric determination unit 17, and the target authentication unit 18 may each be realized by dedicated hardware. In addition, some or all of the components of each device may be realized by a general-purpose circuit (circuitry) or a dedicated circuit, a processor, etc., or a combination of these. They may be configured by a single chip or by multiple chips connected via a bus. Some or all of the components of each device may be realized by a combination of the above-mentioned circuits, etc. and programs.

In the case where some or all of the components of the input unit 12, the output unit 13, the response specification unit 14, the response judgment unit 15, the face authentication unit 16, the biometric determination unit 17, and the target authentication unit 18 are realized by a plurality of information processing devices, circuits, or the like, the plurality of information processing devices, circuits, or the like may be centrally located or distributed. For example, the information processing devices, circuits, etc. may be realized as an embodiment where each of which is connected via a communication network, such as a client-server system, a cloud computing system, etc.

Figure 2:
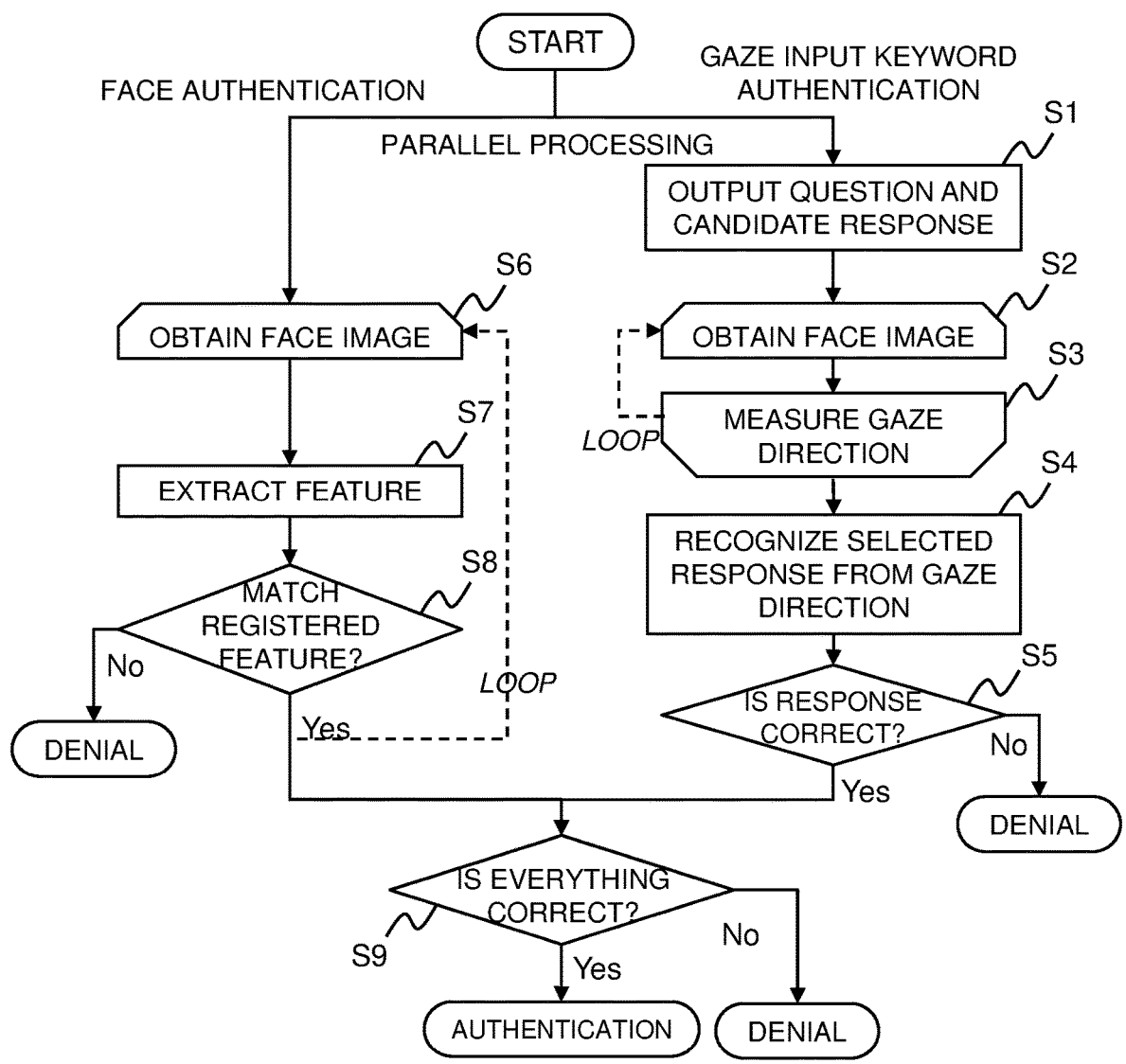
FIG. 2 It depicts a flowchart showing an operation example of an authentication system in the first exemplary embodiment.

Next, an operation of the authentication system 100 in this exemplary embodiment will be described. FIG. 2 is a flowchart showing an operation example of an authentication system 100 in this exemplary embodiment.

The output unit 13 outputs a plurality of candidate responses to the questions to be asked to the target on the display device (step S1). Then, when the imaging device 20 captures the target's face image, the input unit 12 obtains the captured face image for the purpose of performing the gaze input keyword authentication (step S2). The response specification unit 14 specifies a response to the question from among the candidate responses based on the target's gaze in the captured face image. That is, the response specification unit 14 measures the direction of the gaze (step S3) and recognizes the selected response based on the direction of the gaze (step S4). Steps S2 and S3 are repeated until a response is authenticated.

The response judgment unit 15 makes a correctness or incorrectness judgment of the specified response. That is, the response judgment unit 15 judges the correctness of the response (step S5). If the response is not correct (No in step S5), the authentication device 10 denies authentication.

Meanwhile, in parallel with the process from step S1 to step S5, when the imaging device 20 captures a face image of the target, the input unit 12 obtains the captured face image for face authentication (step S6). The imaging device 20 may be different for the gaze input keyword authentication and face authentication. The face authentication unit 16 performs target's face authentication from the captured face image. Specifically, the face authentication unit 16 extracts features from the face image (step S7). Then, face authentication unit 16 determines whether the extracted features match the registered features (step S8). If the extracted features do not match the registered features (No in step S8), the authentication device 10 denies authentication. The process from step S6 to step S8 is repeated while the features are judged to match.

When all processing has been performed correctly (Yes in step S9), the target authentication unit 18 determines that the target has been authenticated. That is, the target authentication unit 18 determines that the target has been authenticated when the responses are correct (Yes in step S5) and the extracted features match the registered features (Yes in step S8). On the other hand, if any part of the process was not performed correctly (No in step S9), the target authentication unit 18 denies the authentication.

As described above, in this exemplary embodiment, the output unit 13 outputs a plurality of candidate responses to questions to the target on the display device, and when the response specification unit 14 specifies a response to the question from among the candidate responses based on the target's gaze in the face image captured by the imaging device 2, the response judgment unit 15 makes a correctness or incorrectness judgment of the specified response. On the other hand, the face authentication unit 16 performs target's face authentication from the face image captured by the imaging device 20, and the biometric determination unit 17 performs target's biometrics determination based on changes in the target's gaze detected from a plurality of the face image. The target authentication unit 18 authenticates the target based on the results of the correctness or incorrectness judgment, the biometric determination, and the face authentication. Thus, the target can be authenticated with high accuracy by detecting spoofing of the target while improving the convenience of the authenticator and the target's authentication.

Specifically, the authentication device 10 in this exemplary embodiment can provide authentication and anti-spoofing technology that authenticates individuals with high accuracy, while at the same time providing a low risk of unauthorized access or spoofing and high convenience for both the target and the authenticator. The first reason for this is that the combination of face authentication and the gaze input keyword authentication can authenticate individuals with high accuracy.

The second reason is that the risk of unauthorized access is minimized by using the target's biometric information in the form of a face image and the information in the target's memory in the form of keywords as the keys to authentication. Furthermore, the gaze that can be specified from a part of the face image can be used as a movement to select a keyword in the memory, and based on this movement, it is verified that the person is a living body, making it extremely difficult to gain unauthorized access or spoofing.

The third reason is that the target only needs to gaze at the responses to the questions presented on the display device for a short period of time, a small burden, in order to perform the two authentications and spoofing prevention described above. In addition, the target does not need to carry personal belongings, is hands-free, and does not need to worry about a furtive glance or eavesdropping by surrounding third parties, making the system extremely convenient.

The fourth reason is that the authenticator only needs to install a display device and a camera to capture face images in order to perform the two authentications and spoofing prevention described above. This enables highly accurate multi-factor authentication and spoofing prevention in a short period of time and is extremely convenient because it does not require the installation of walls or shields to prevent a furtive glance or eavesdropping by surrounding third parties. For example, commercially available smartphones, tablets, and laptop PCs are often equipped with a display device and a camera that captures facial images. Therefore, the authenticator can realize the authentication device 10 of this exemplary embodiment by installing the program in these devices.

Exemplary Embodiment 2

Next, a second exemplary embodiment of the authentication system according to the present invention will be described. This exemplary embodiment describes a method of preventing spoofing using time differences. First, an overview of this exemplary embodiment will be described. In this exemplary embodiment, a face image for the gaze input keyword authentication is obtained at the same time as the face image for face authentication is obtained. The spoofing using the time difference is prevented by performing face authentication using a face image at the same time as the time when the target moves his/her gaze and selects an answer.

Figure 3:
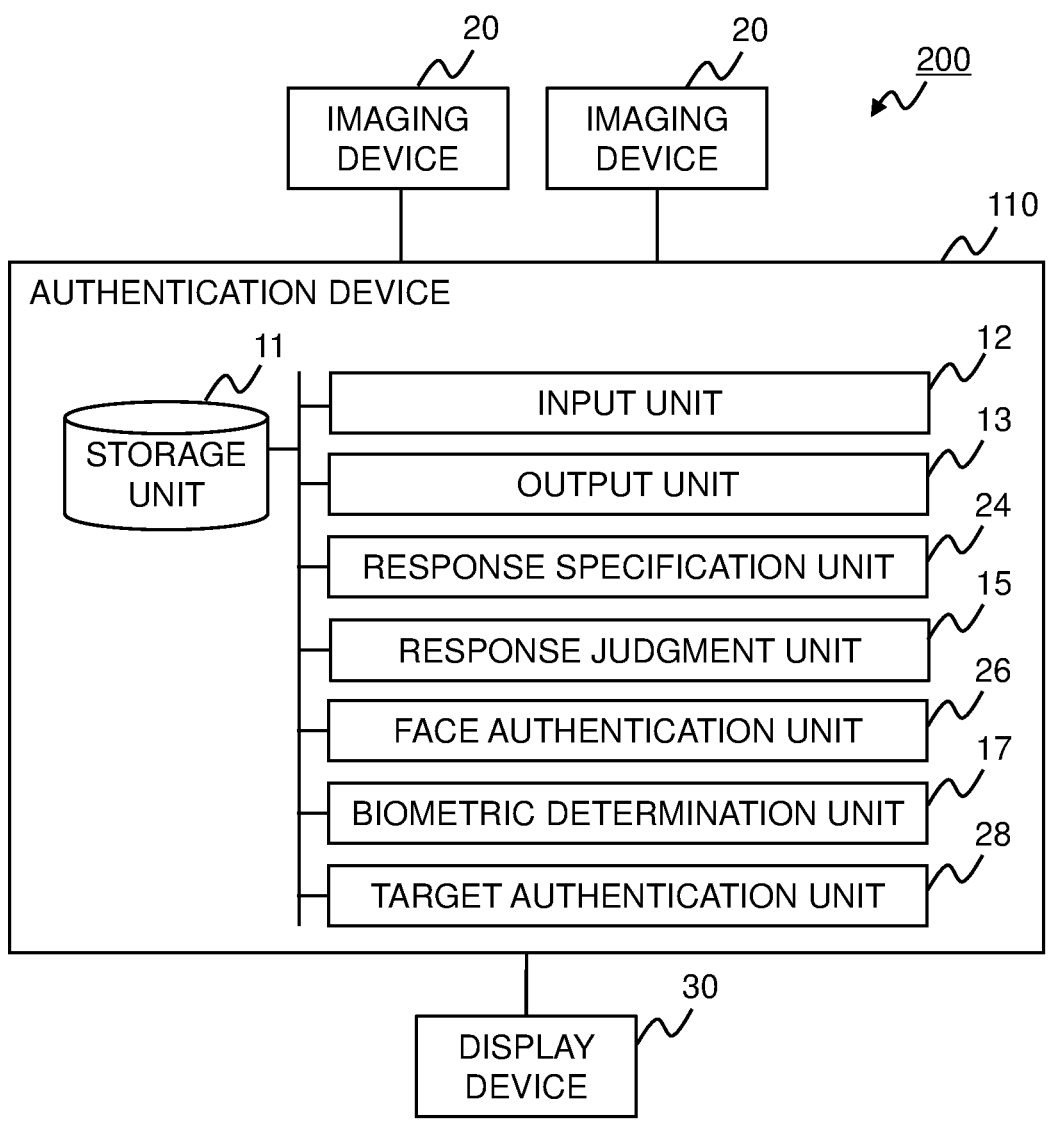
FIG. 3 It depicts a block diagram showing a configuration example of a second exemplary embodiment of an authentication system according to the present invention.

FIG. 3 is a block diagram showing a configuration example of a second exemplary embodiment of an authentication system according to the present invention. The authentication system 200 of this exemplary embodiment includes an authentication device 110, an imaging device 20, and a display device 30. The configuration of the imaging device 20 and the display device 30 is the same as in the first exemplary embodiment.

The authentication device 110 includes a storage unit 11, an input unit 12, an output unit 13, a response specification unit 24, a response judgment unit 15, a face authentication unit 26, a biometric determination unit 17, and a target authentication unit 28. In other words, in this exemplary embodiment of authentication device, the processing performed by the response specification unit 24, the face authentication unit 26, and the target authentication unit 28 differ in part from the response specification unit 14, the face authentication unit 16, and the target authentication unit 18 in the first exemplary embodiment, respectively. Otherwise, they are the same as in the first exemplary embodiment.

The response specification unit 24 obtains response time at which the target specified the response, in addition to the process performed by the response specification unit 14 of the first exemplary embodiment. The face authentication unit 26 obtains a result of the face authentication performed at the same time as the response time, in addition to the process performed by the face authentication unit 16 of the first exemplary embodiment. The target authentication unit 28 then authenticates that the target is a living body matched by the face authentication.

In the case of a single imaging device 20, the same frame image should be used for both the face image for the gaze input keyword authentication and the face image for face authentication.

The input unit 12, the output unit 13, the response specification unit 24, the response judgment unit 15, the face authentication unit 26, the biometric determination unit 17, and the target authentication unit 28 are provided by a computer processor operating according to the program (authentication program).

Figure 4:
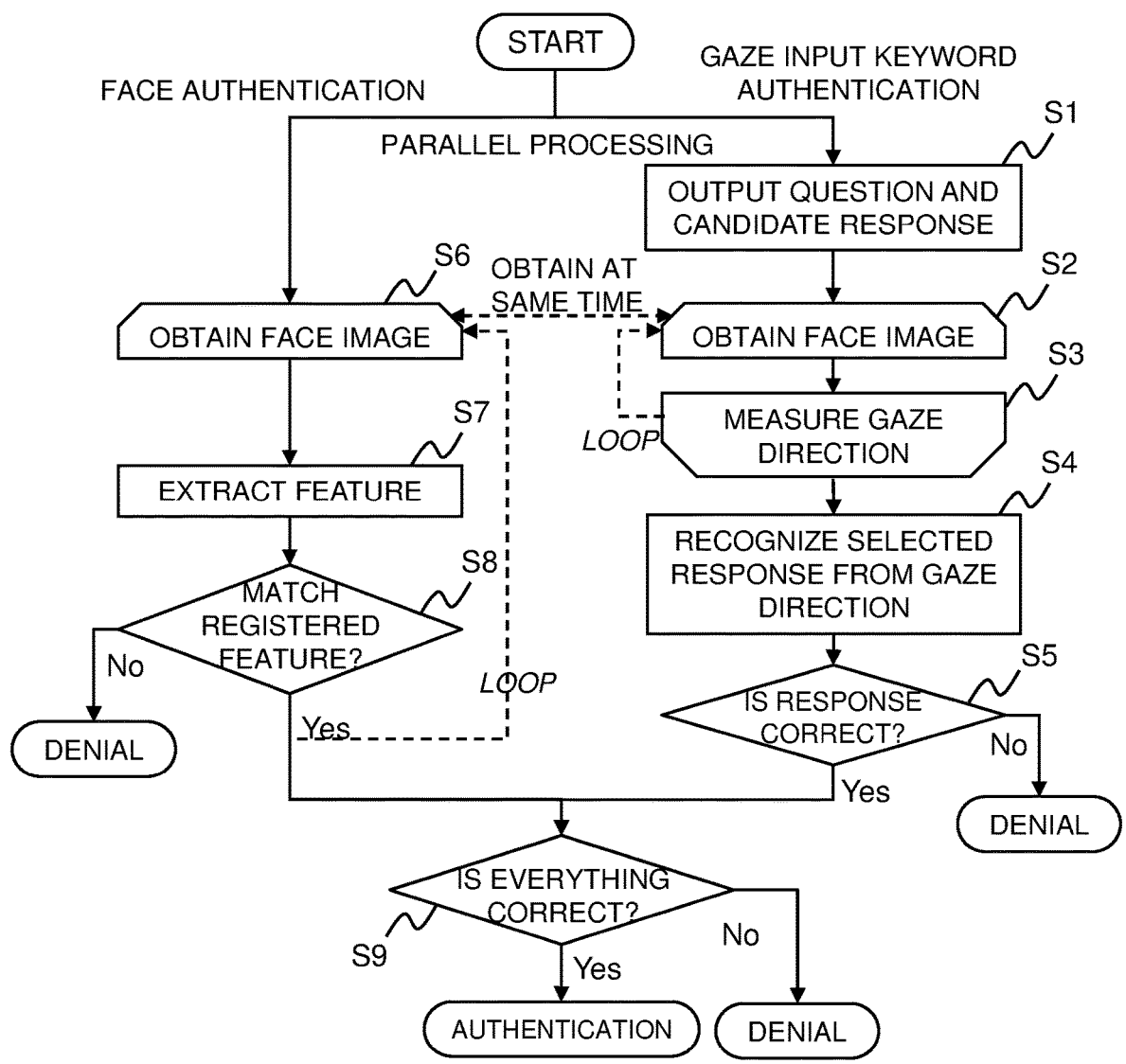
FIG. 4 It depicts a flowchart showing an operation example of an authentication system in the second exemplary embodiment.

Next, an operation of the authentication system 200 in this exemplary embodiment will be described. FIG. 4 is a flowchart showing an operation example of an authentication system 100 in this exemplary embodiment. The flowchart shown in FIG. 4 is different from the flowchart shown in FIG. 2 in that the time to obtain the face image in step S2 and step S6 is the same. Otherwise, the flowchart is the same as the flowchart shown in FIG. 2. This does not preclude the flowchart shown in FIG. 2 from having the same time for obtaining face images in steps S2 and S6.

As described above, in addition to the configuration of the first exemplary embodiment, in this exemplary embodiment, the response specification unit 24 obtains the response time at which the target specified the response, the face authentication unit 26 obtains the result of the face authentication performed at the same time as the response time, and the target authentication unit 28 authenticates that the target is a living body matched by the face authentication. Thus, in addition to the effect of the first exemplary embodiment, the effect of suppressing spoofing can be enhanced.

Exemplary Embodiment 3

Next, a third exemplary embodiment of the authentication system according to the present invention will be described. This exemplary embodiment describes a more specific configuration that prevents spoofing. First, an overview of this exemplary embodiment will be described. In this exemplary embodiment, the process of obtaining a target's face image and measuring the direction of the target's gaze and the direction of the face from that image is repeated several times. For this result, a relative angle change between the direction of gaze and the direction of the face is checked and if the change is greater than a certain level, it is judged positive (i.e., not spoofing), and if the change is within the measurement error, it is judged negative (i.e., spoofing).

The reasons for this determination are as follows. In fact, when searching for the correct response among the candidate responses presented on the display device, it is common for humans to try to find the response quickly by moving their gaze widely while making small movements in the direction of the entire face. Therefore, by checking the change in the relative angle between the direction of the gaze and the direction of the face, it is possible to verify that the obtained face image is that of a living body with higher accuracy and ease. This feature indicates that highly accurate face authentication and highly accurate spoofing prevention can be performed simultaneously during one action of searching for a response by the target. In other words, this is a special effect, not a mere combination, for the convenience of the target and the accuracy requirements of the authenticator.

Figure 5:
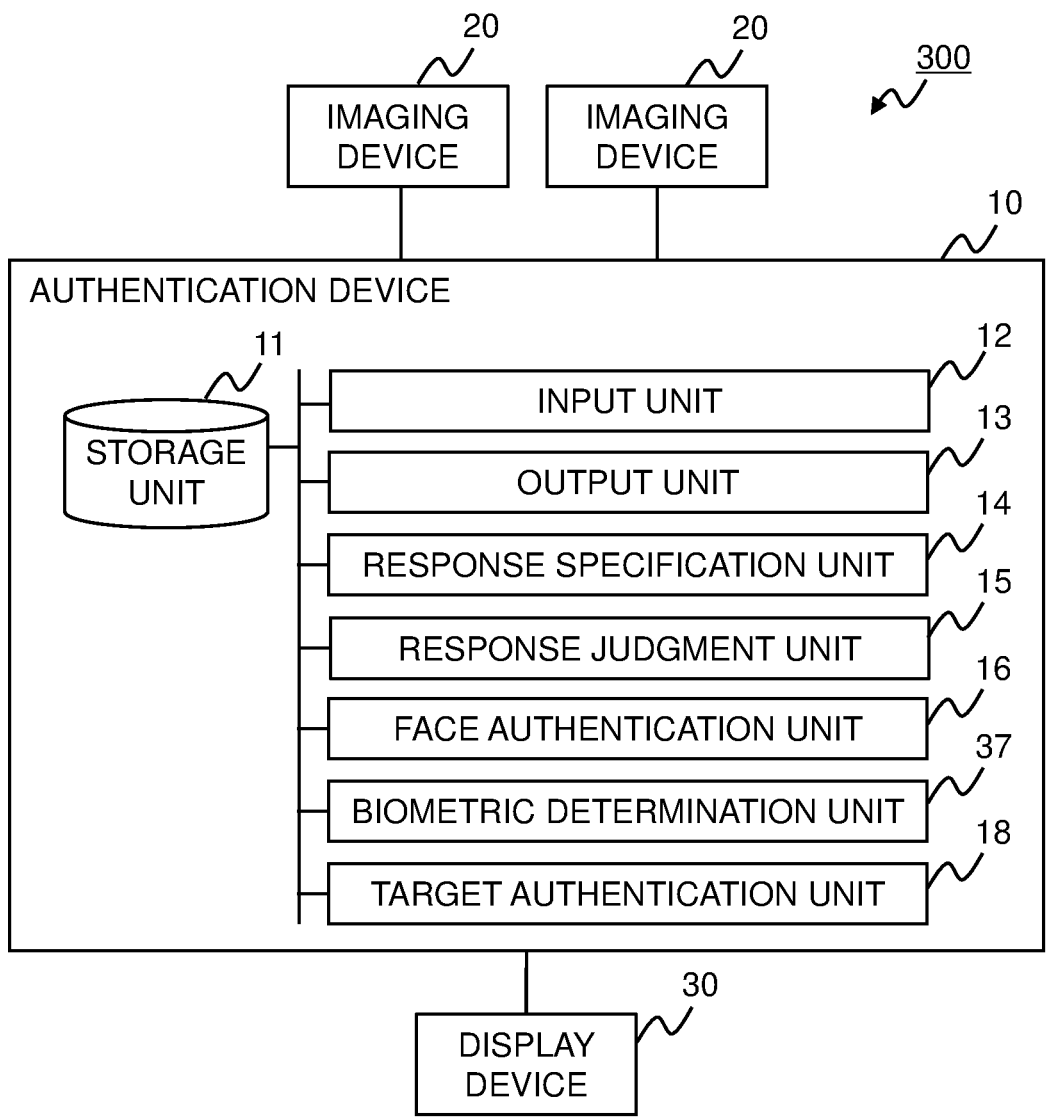
FIG. 5 It depicts a block diagram showing a configuration example of a third exemplary embodiment of an authentication system according to the present invention.

FIG. 5 is a block diagram showing a configuration example of a third exemplary embodiment of an authentication system according to the present invention. The authentication system 300 of this exemplary embodiment includes an authentication device 210, an imaging device 20, and a display device 30. The configuration of the imaging device 20 and the display device 30 is the same as in the first and second exemplary embodiments.

The authentication device 210 includes a storage unit 11, an input unit 12, an output unit 13, a response specification unit 14, a response judgment unit 15, a face authentication unit 16, a biometric determination unit 37, and a target authentication unit 18. In other words, in this exemplary embodiment of authentication device, the processing performed by the biometric determination unit 37 differs in part from the biometric determination unit 17 in the first exemplary embodiment. Otherwise, they are the same as in the first exemplary embodiment. For each configuration of the second exemplary embodiment, the biometric determination unit 37 may be used instead of the biometric determination unit 17.

The biometric determination unit 37 detects a relative angle change of the gaze with respect to the direction of a face while the target moves the gaze and selects a response, and performs the target's biometrics determination. The biometric determination unit 37 may determine that the target is a living body when detecting a change greater than a predetermined amount of change, as described above.

The input unit 12, the output unit 13, the response specification unit 14, the response judgment unit 15, the face authentication unit 16, the biometric determination unit 37, and the target authentication unit 18 are provided by a computer processor operating according to the program (authentication program).

Figure 6:
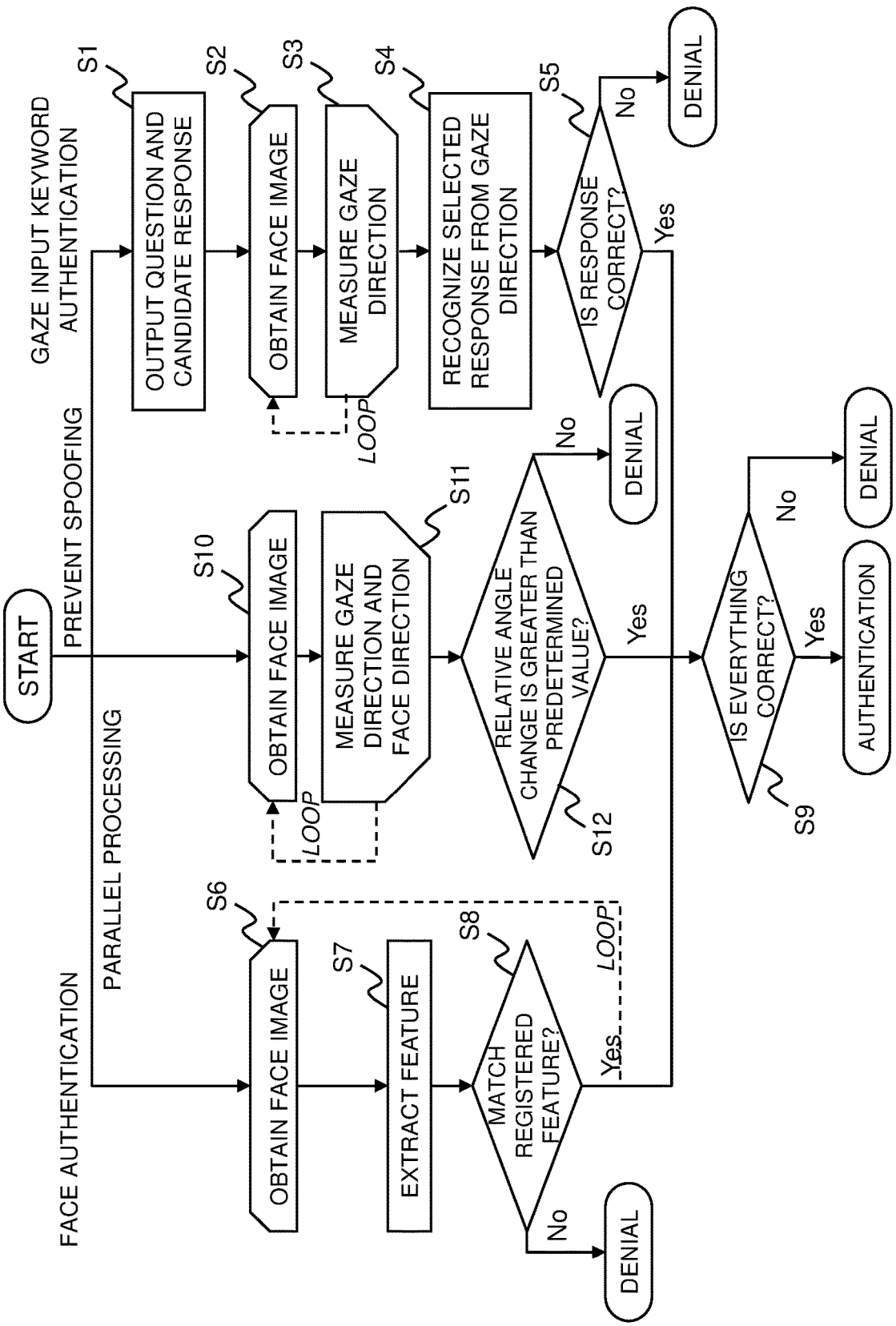
FIG. 6 It depicts a flowchart showing an operation example of an authentication system in the third exemplary embodiment.

Next, an operation of the authentication system 300 in this exemplary embodiment will be described. FIG. 6 is a flowchart showing an operation example of an authentication system 300 in this exemplary embodiment. The processing from step S1 to step S8 is the same as in the first exemplary embodiment. As in the second exemplary embodiment, the time to obtain the face image in step S2 and step S6 may be the same.

In this exemplary embodiment, the processing from step S10 to step S12 is performed in parallel with processing from step S1 to step S5 and from step S6 to step S8. Specifically, the biometric determination unit 37 obtains a face image (Step S10) and measures the direction of gaze and the direction of face (Step S11). Repeating the process from step S10 to step S11, the biometric determination unit 37 check the relative angle change (step S12).

If the relative angle change is not greater than a predetermined value (No in step S12), the authentication device 210 denies the authentication. On the other hand, if the relative angle change is greater than the predetermined value (Yes in step S12), the target authentication unit 18 authenticates the target based on the results of the correctness or incorrectness judgment, the biometric determination, and the face authentication (Step S9).

As explained in the second exemplary embodiment, the same frame face image captured by the same imaging device 20 may be used for both face authentication and the gaze input keyword authentication.

As described above, in addition to the configuration of the first exemplary embodiment, in this exemplary embodiment, the biometric determination unit 37 detects a relative angle change of the gaze with respect to the direction of a face while the target moves the gaze and selects a response, and performs the target's biometrics determination. Therefore, in addition to the effect of the first exemplary embodiment, the effect of suppressing spoofing can be enhanced.

Figure 7:
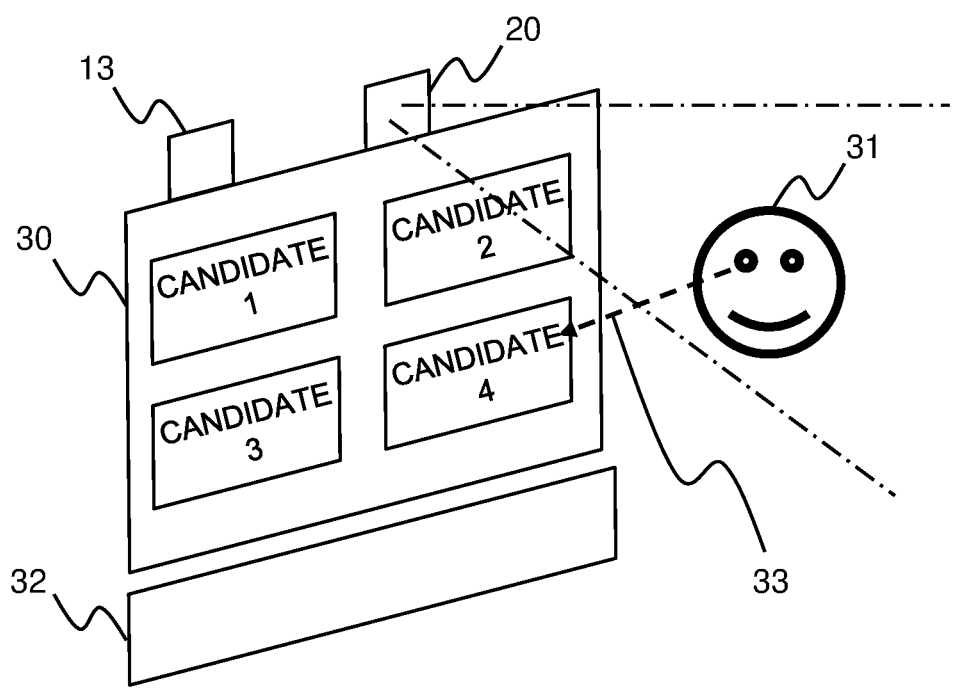
FIG. 7 It depicts an explanatory diagram showing an example of operation when performing gaze input keyword authentication.

Next, it is explained a specific example using the authentication system 100 of the first exemplary embodiment. FIG. 7 is an explanatory diagram showing an example of operation when performing gaze input keyword authentication. When the target 31 appears in front of the authentication device 10, the output unit 13 outputs a plurality of question candidates, such as "What's your ID number?", "What's your PIN number?", at random positions on the screen of the display device 30. Then, the imaging device 20 captures the face image of the target 31, and the analysis unit 32 including the response specification unit 14 and the response judgment unit 15 specifies the response selected by the target 31 based on the direction of his/her gaze 33. The analysis unit 32 then checks the specified response against the correct response registered in advance, and makes a correctness or incorrectness judgment. With this correctness or incorrectness judgment, the authentication device 10 authenticates if the response is correct, and denies if the response is incorrect.

The authentication system 200 of the second exemplary embodiment and the authentication system 300 of the third exemplary embodiment are processed in the same manner. By handling such systems as a single unit, the effect is that installation and maintenance are easier than with individual components. For example, the imaging device 20 and the analysis unit described above can be shared for each of the uses performed in each of the above exemplary embodiments.

Figure 8:
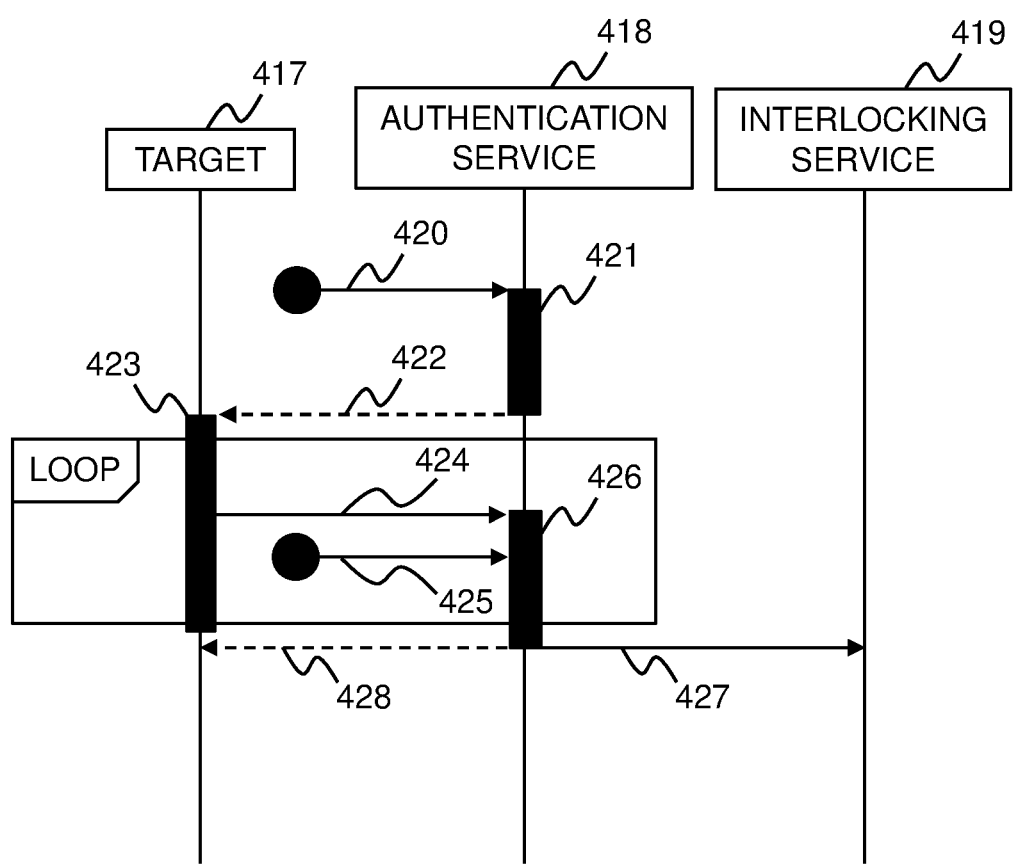
FIG. 8 It depicts an explanatory sequence diagram showing an example of operation using the authentication system.

Next, an example of operation of the authentication system when used for authentication services is described. FIG. 8 is an explanatory sequence diagram showing an example of operation using the authentication system. The example shown in FIG. 8 illustrates the operation when the authentication system of the present invention is used as an authentication service 418 when the target 417 uses the interlocking service 419. In other words, as illustrated in FIG. 8, in this operation example, it is assumed that there are three objects: the target 417, the authentication service 418, and the interlocking service 419, and by exchanging and executing messages between these three objects, the authentication service as a whole is provided.

The interlocking service 419 includes, for example, an ATM (automatic teller machine) service that allows deposits and withdrawals according to the results of authentication, and an admission control service that opens and closes doors and gates according to the results of authentication.

First, when the target 417 appears at the authentication system, the authentication service 418 detects this in some way and starts the authentication service. Specifically, for example, the authentication service 418 may recognize the start of the authentication service when the target 417 presses an authentication start button, or the authentication service 418 may detect a human face of a certain size or larger in the image of the camera (imaging device 20) and recognize the appearance of the target 417. In the example shown in FIG. 8, this is generalized to notation as the found message 420 being sent to the authentication service 418 from an object not on the diagram.

When receiving the found message 420, the authentication service 418 outputs a question and a candidate response as an operation 421. Specifically, the authentication service 418 sets questions such as "What is your ID number?" and "What is your password?" and numbers from 0 to 9 as candidate responses, and outputs the candidate response at random locations on display device 30.

Here, in operation 421, the authentication service 418 may perform face authentication of the target, set a secret question pre-registered, such as "What is the name of the elementary school you graduated from?", by the target estimated from the result, and set a pre-registered answer, etc. as a candidate answer and output them.

The authentication service 418 then sends the set questions as a message 422 to the target 417. Specifically, the authentication service 418 may, for example, output the question audibly through a speaker device or display the question on the display device 30.

The target 417 who received the question as a message 422 looks for a correct response among the candidate responses output at a random position on the display device 30 The target 417, and performs operation 423 to gaze at the correct response. In this operation 423, the target 417 repeatedly sends the message 424 to the authentication service 418 in the form of the direction of gaze. In parallel with operation 423, the authentication service 418 repeatedly captures the face image of the target 417 with a camera (imaging device 20). In the example shown in FIG. 8, the face image to be obtained is denoted as a found message 425 sent from an object not on the diagram to the authentication service 418.

When receiving the message 424 and the message 425, the authentication service 418 performs, as operation 426, the gaze input keyword authentication, which authenticates and matches responses based on the direction of gaze, the face authentication, which extracts and matches features from the face image, and checking to prevent spoofing based on changes in the relative angle of gaze and face direction that changes over time. The authentication service 418 then notifies the authentication result to the interlocking service 419 as a message 427, and also replies to the target 417 as a message 428. The authentication service 418 may communicate the authentication results to the target 417, for example, by means of an announcement tone or alarm tone.

As illustrated in FIG. 8, the action required of the target 417 is to select the candidate responses shown in operation 423. Thus, in the exemplary embodiment described above, multiple authentications can be performed simultaneously by having the target select a candidate response. It can also provide high reliability and convenience to both the target and the authenticator. The above-described exemplary embodiment may be realized in any device or equipment in which it is divided.

Figure 9:
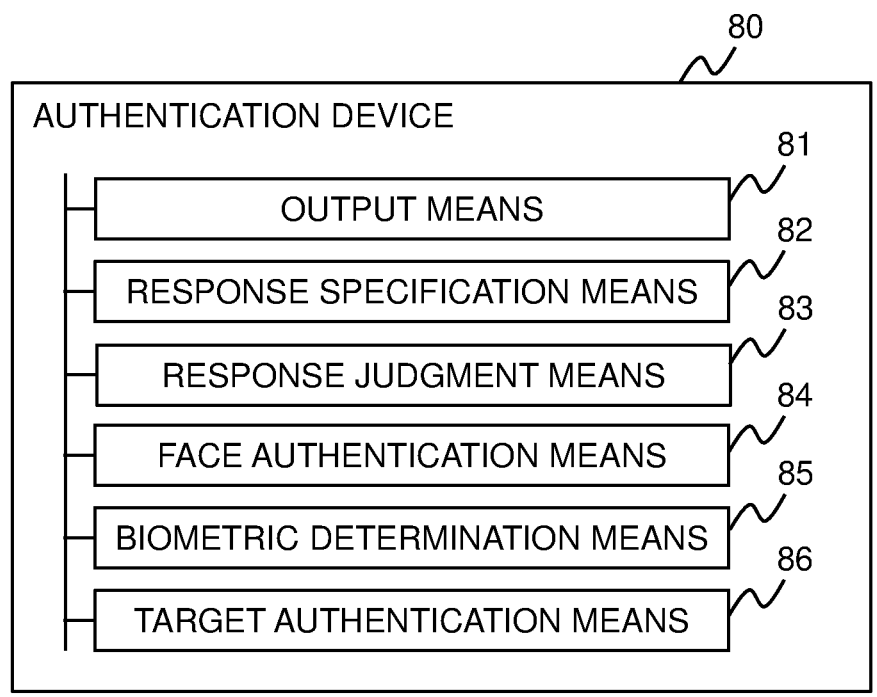
FIG. 9 It depicts a block diagram showing an overview of an authentication device according to the present invention.

Next, an overview of the present invention will be described. FIG. 9 is a block diagram showing an overview of an authentication device according to the present invention. The authentication device 80 according to the present invention is an authentication device (for example, the authentication device 10) which authenticates a target, comprises an output means 81 (e.g., output unit 13) which outputs a plurality of candidate responses to questions to the target on a display device (e.g., display device 30), a response specification means 82 (e.g., response specification unit 14) which specifies a response to the question from among the candidate responses based on a target's gaze in a face image captured by an imaging device (e.g., imaging device 20) that captures a face image of the target, a response judgment means 83 (e.g., response judgment unit 15) which makes a correctness or incorrectness judgment of the specified response, a face authentication means 84 (e.g., face authentication unit 16) which performs target's face authentication from the face image captured by the imaging device, a biometric determination means 85 (e.g., biometric determination unit 17) which performs target's biometrics determination based on changes in the target's gaze detected from a plurality of the face image, and a target authentication means 86 (e.g., target authentication unit 18) which authenticates the target based on results of the correctness or incorrectness judgment, the biometrics determination, and the face authentication.

Such a configuration can detect spoofing of the target and authenticate the target with high accuracy, while improving the convenience of the authenticator and the target during authentication.

The response specification means 82 may obtain response time at which the target specified the response, the face authentication means 84 may obtain a result of the face authentication performed at the same time as the response time, and the target authentication means 86 may authenticate that the target is a living body matched by the face authentication.

The biometric determination means 85 may detect a relative angle change of the gaze with respect to the direction of a face while the target moves the gaze and selects a response, and perform the target's biometrics determination.

The output means 81 may output a plurality of candidate responses corresponding to the target-specific questions authenticated by the face authentication on the display device.

The response specification means 82 may specify a response based on the target's gaze in a first face image captured by a first imaging device, and the face authentication means 84 may perform target's face authentication from a second face image captured by a second imaging device.

Figure 10:
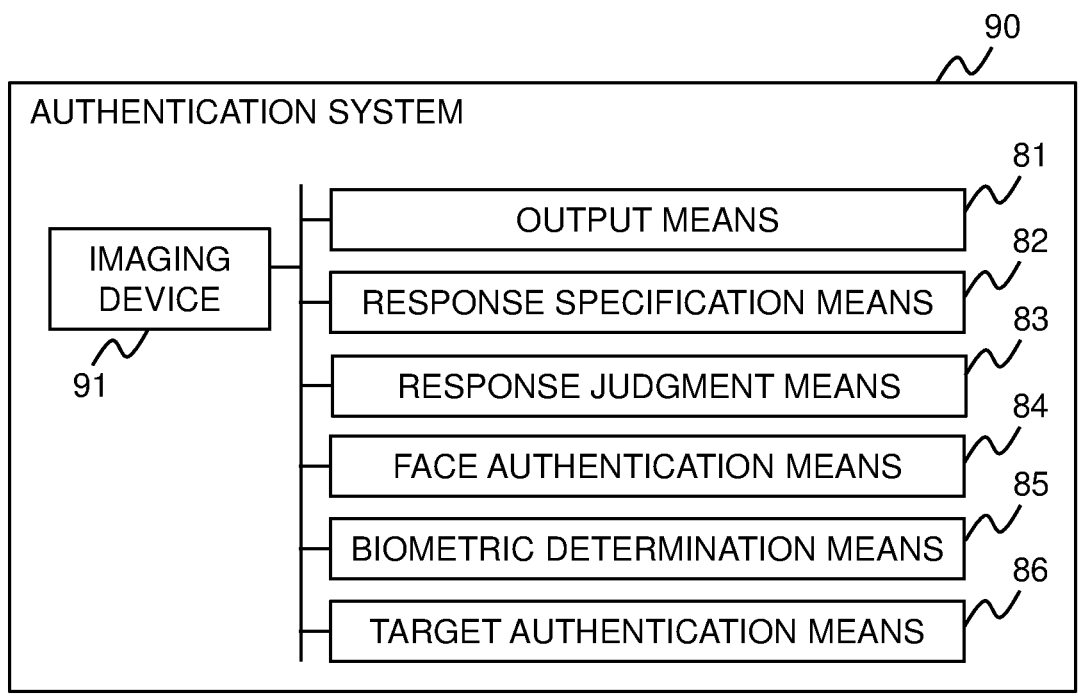
FIG. 10 It depicts a block diagram showing an overview of an authentication system according to the present invention.

FIG. 10 is a block diagram showing an overview of an authentication system according to the present invention. The authentication system 90 according to the present invention is an authentication system (for example, the authentication system 100) which authenticates a target, comprises Such a configuration can also detect spoofing of the target and authenticate the target with high accuracy, while improving the convenience of the authenticator and the target during authentication.

A part of or all of the above example embodiment may also be described as, but not limited to, the following supplementary notes.

(Supplementary note 1) An authentication device which authenticates a target comprising: an output means which outputs a plurality of candidate responses to questions to the target on a display device; a response specification means which specifies a response to the question from among the candidate responses based on a target's gaze in a face image captured by an imaging device that captures a face image of the target; a response judgment means which makes a correctness or incorrectness judgment of the specified response; a face authentication means which performs target's face authentication from the face image captured by the imaging device; a biometric determination means which performs target's biometrics determination based on changes in the target's gaze detected from a plurality of the face image; and a target authentication means which authenticates the target based on results of the correctness or incorrectness judgment, the biometrics determination, and the face authentication.

(Supplementary note 2) The authentication device according to Supplementary note 1, wherein the response specification means obtains response time at which the target specified the response, the face authentication means obtains a result of the face authentication performed at the same time as the response time, and the target authentication means authenticates that the target is a living body matched by the face authentication.

(Supplementary note 3) The authentication device according to Supplementary note 1 or 2, wherein the biometric determination means detects a relative angle change of the gaze with respect to the direction of a face while the target moves the gaze and selects a response, and performs the target's biometrics determination.

(Supplementary note 4) The authentication device according to any one of Supplementary notes 1 to 3, wherein the output means outputs a plurality of candidate responses corresponding to the target-specific questions authenticated by the face authentication on the display device.

(Supplementary note 5) The authentication device according to any one of Supplementary notes 1 to 4, wherein the response specification means specifies a response based on the target's gaze in a first face image captured by a first imaging device, and the face authentication means performs target's face authentication from a second face image captured by a second imaging device.

(Supplementary note 6) An authentication system which authenticates a target comprising: an imaging device which captures a face image of the target; an output means which outputs a plurality of candidate responses to questions to the target on a display device; a response specification means which specifies a response to the question from among the candidate responses based on a target's gaze in the captured face image; a response judgment means which makes a correctness or incorrectness judgment of the specified response; a face authentication means which performs target's face authentication from the captured face image; a biometric determination means which performs target's biometrics determination based on changes in the target's gaze detected from a plurality of the face image; and a target authentication means which authenticates the target based on results of the correctness or incorrectness judgment, the biometrics determination, and the face authentication.

(Supplementary note 7) The authentication system according to Supplementary note 6, further comprising a plurality of imaging devices which capture the face image of the target, wherein the response specification means specifies a response based on the target's gaze in a first face image captured by a first imaging device, and the face authentication means performs target's face authentication from a second face image captured by a second imaging device.

(Supplementary note 8) An authentication method which authenticates a target comprising: outputting a plurality of candidate responses to questions to the target on a display device; specifying a response to the question from among the candidate responses based on a target's gaze in a face image captured by an imaging device that captures a face image of the target; making a correctness or incorrectness judgment of the specified response; performing target's face authentication from the face image captured by the imaging device; performing target's biometrics determination based on changes in the target's gaze detected from a plurality of the face image; and authenticating the target based on results of the correctness or incorrectness judgment, the biometrics determination, and the face authentication.

(Supplementary note 9) The authentication method according to Supplementary note 8, further comprising: obtaining response time at which the target specified the response; obtaining a result of the face authentication performed at the same time as the response time; and authenticating that the target is a living body matched by the face authentication.

(Supplementary note 10) A program recording medium that stores an authentication program that is applied to a computer that authenticates a target, and causing the computer to execute: an output process of outputting a plurality of candidate responses to questions to the target on a display device; a response specification process of specifying a response to the question from among the candidate responses based on a target's gaze in a face image captured by an imaging device that captures a face image of the target; a response judgment process of making a correctness or incorrectness judgment of the specified response; a face authentication process of performing target's face authentication from the face image captured by the imaging device; a biometric determination process of performing target's biometrics determination based on changes in the target's gaze detected from a plurality of the face image; and a target authentication process of authenticating the target based on results of the correctness or incorrectness judgment, the biometrics determination, and the face authentication.

(Supplementary note 11) The program recording medium according to Supplementary note 10, wherein response time at which the target specified the response is obtained, in the response specification process, a result of the face authentication performed at the same time as the response time is obtained, in the face authentication process, and the target is authenticated as a living body matched by the face authentication, in the target authentication process.

(Supplementary note 12) An authentication program that is applied to a computer that authenticates a target, and causing the computer to execute: an output process of outputting a plurality of candidate responses to questions to the target on a display device; a response specification process of specifying a response to the question from among the candidate responses based on a target's gaze in a face image captured by an imaging device that captures a face image of the target; a response judgment process of making a correctness or incorrectness judgment of the specified response; a face authentication process of performing target's face authentication from the face image captured by the imaging device; a biometric determination process of performing target's biometrics determination based on changes in the target's gaze detected from a plurality of the face image; and a target authentication process of authenticating the target based on results of the correctness or incorrectness judgment, the biometrics determination, and the face authentication.

(Supplementary note 13) The authentication program according to Supplementary note 12, wherein response time at which the target specified the response is obtained, in the response specification process, a result of the face authentication performed at the same time as the response time is obtained, in the face authentication process, and the target is authenticated as a living body matched by the face authentication, in the target authentication process.

Although the invention of the present application has been described above with reference to example embodiment and the example, the present invention is not limited to the above example embodiment and the example. Various changes can be made to the configuration and details of the present invention that can be understood by those skilled in the art within the scope of the present invention.

INDUSTRIAL APPLICABILITY

The present invention is suitably applied to an authentication device that authenticates a target. Specifically, the invention can be used for personal authentication in financial transactions and contractual acts. Not only that, the invention can be applied to various industrial fields, such as the security field, such as restricting who can enter a certain area, or the commercial field, such as providing special services to a person visiting a certain store.

REFERENCE SIGNS LIST 10, 110, 210 Authentication device
11 Storage unit
12 Input unit
13 Output unit
14, 24 Response specification unit
15 Response judgment unit
16, 26 Face authentication unit
17, 37 Biometric determination unit
18, 28 Target authentication unit
20 Imaging device
30 Display device
100, 200, 300 Authentication system

What is claimed is:
1. An authentication device which authenticates a target, the authentication device comprising:
a memory storing instructions; and
one or more processors configured to execute the instructions to:
output a plurality of candidate responses to a question to the target, on a display device;
specify a response to the question from among the candidate responses based on a gaze of the target in a plurality of face images captured by an imaging device;
obtain response time at which the target specified the response;
make a correctness or incorrectness judgment of the specified response;

perform face authentication of the target from the face images;

obtain a result of the face authentication performed at a same time as the response time;

authenticate that the target is a living body based on the face image;

perform biometrics determination of the target based on changes in the gaze of the target;

authenticate the target based on results of the correctness or incorrectness judgment, the biometrics determination, and the face authentication; and detect a relative angle change of the gaze with respect to a direction of a face of the target while the target changes the gaze thereof and selects a response, and perform the biometrics determination based on the relative angle change.

2. The authentication device according to claim 1, wherein the processor further executes instructions to output, on the display device, the candidate responses corresponding to target-specific questions upon the face authentication.

3. The authentication device according to claim 1, wherein the processor further executes instructions to:

specify the response based on the gaze of the target in a first face image captured by a first imaging device; and perform the face authentication from a second face image captured by a second imaging device.

4. An authentication system which authenticates a target, the authentication system comprising:

an imaging device which captures a face image of the target; a memory storing instructions; and one or more processors configured to execute the instructions to:

output a plurality of candidate responses to a question to the target, on a display device;

specify a response to the question from among the candidate responses based on a gaze of the target in a plurality of face images captured by an imaging device;

obtain response time at which the target specified the response;

make a correctness or incorrectness judgment of the specified response;

perform face authentication of the target from the face images;

obtain a result of the face authentication performed at a same time as the response time;

authenticate that the target is a living body based on the face image;

perform biometrics determination of the target based on changes in the gaze of the target;

authenticate the target based on results of the correctness or incorrectness judgment, the biometrics determination, and the face authentication; and detect a relative angle change of the gaze with respect to a direction of a face of the target while the target changes the gaze thereof and selects a response, and perform the biometrics determination based on the relative angle change.

5. The authentication system according to claim 4, comprising a first imaging device and a second imaging device which respectively capture a first image and a second face image of the target, wherein the processor further executes instructions to:

specify the response based on the gaze of the target in the first face image captured by the first imaging device; and perform the face authentication from the second face image captured by the second imaging device.

6. An authentication method which authenticates a target, the authentication method performed by a processor and comprising:

outputting a plurality of candidate responses to a question to the target, on a display device;

specifying a response to the question from among the candidate responses based on a gaze of the target in a plurality of face images captured by an imaging device;

obtaining response time at which the target specified the response; making a correctness or incorrectness judgment of the specified response;

performing face authentication of the target from the face images;

obtaining a result of the face authentication performed at a same time as the response time;

authenticating that the target is a living body based on the face image;

performing biometrics determination of the target based on changes in the gaze of the target;

authenticating the target based on results of the correctness or incorrectness judgment, the biometrics determination, and the face authentication; and detect a relative angle change of the gaze with respect to a direction of a face of the target while the target changes the gaze thereof and selects a response, and perform the biometrics determination based on the relative angle change.

7. The authentication device according to claim 1, wherein the processor further executes the instructions to prevent spoofing using a time difference.

8. The authentication device according to claim 1, wherein the processor further executes the instructions to perform the face authentication and a measurement of the gaze of the target to select the response multiple times in parallel to verifying that the gaze of the target is moving.

9. The authentication device according to claim 1, wherein the authenticate that the target is a living body comprises determining that the target is a living body upon detecting that the relative angle is greater than a predetermined amount of change.

* * * * *